Aug. 2, 1932.    C. R. NEWCOMB    1,870,134
SILENT GEAR SHIFT FOR AUTOMOBILE ENGINES
Filed Dec. 19, 1930    3 Sheets-Sheet 1
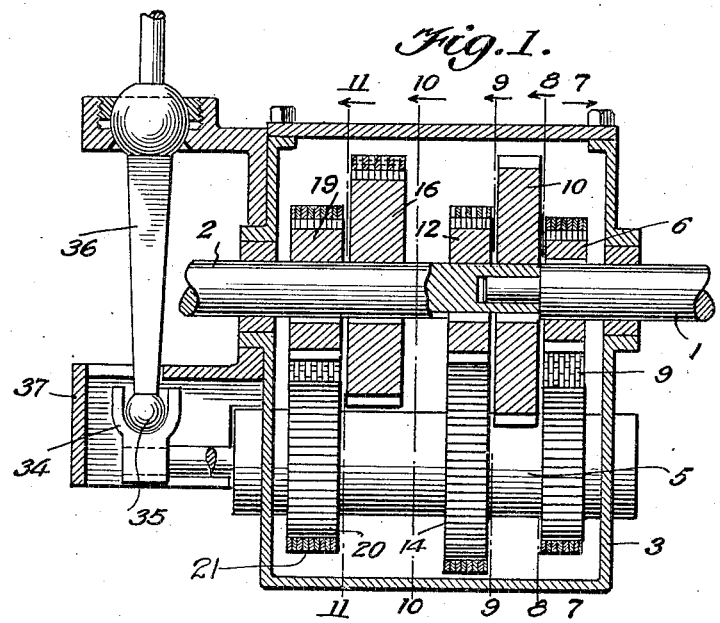
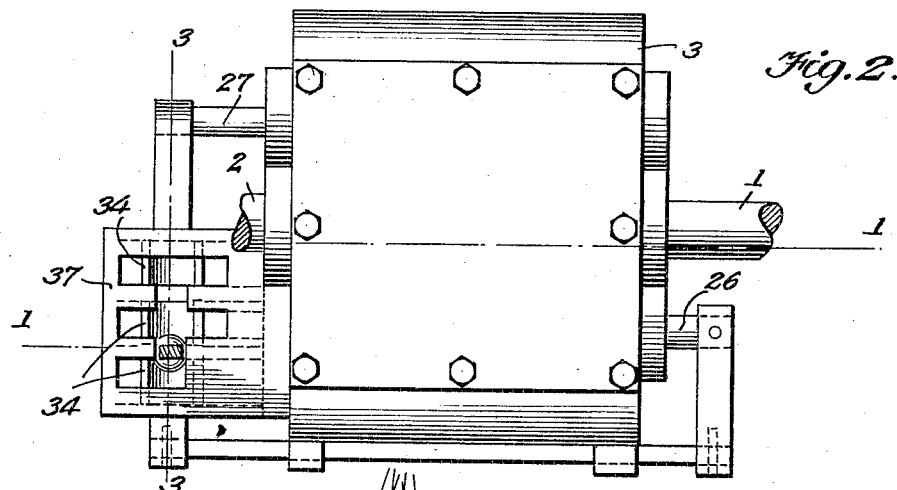
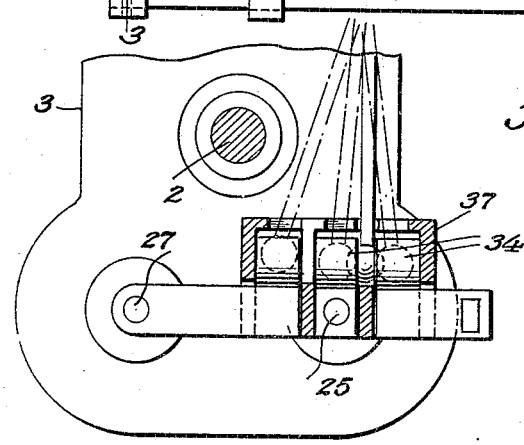
Clyde R. Newcomb
INVENTOR
BY Victor J. Evans
ATTORNEY

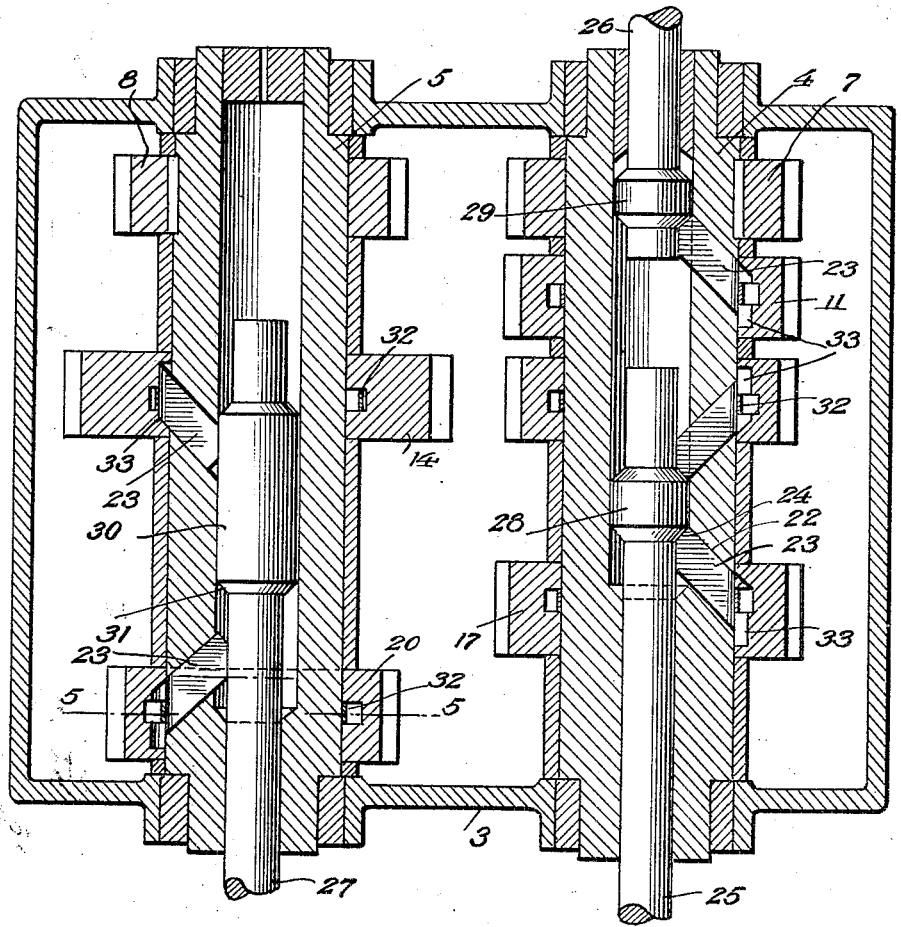
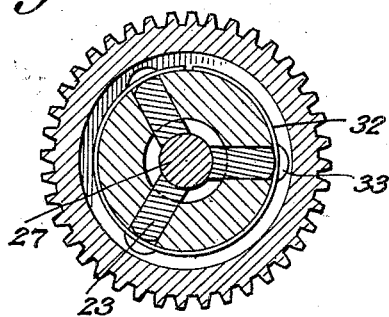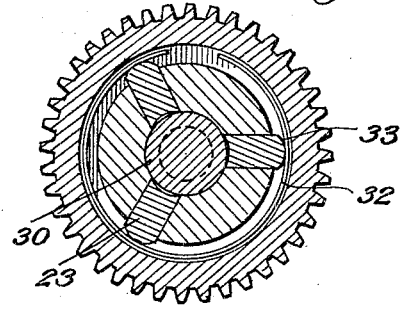

Aug. 2, 1932.   C. R. NEWCOMB   1,870,134
SILENT GEAR SHIFT FOR AUTOMOBILE ENGINES
Filed Dec. 19, 1930   3 Sheets-Sheet 3

Clyde R. Newcomb
INVENTOR

BY Victor J. Evans
ATTORNEY

WITNESS:

Patented Aug. 2, 1932

1,870,134

UNITED STATES PATENT OFFICE

CLYDE R. NEWCOMB, OF ORCHARDS, WASHINGTON

SILENT GEAR SHIFT FOR AUTOMOBILE ENGINES

Application filed December 19, 1930. Serial No. 503,557.

This invention relates to a gear shift mechanism especially adapted to be used upon automobile engines and it consists in the novel features hereinafter described and claimed.

An object of the invention is to provide a gear shift mechanism of the character stated which is noiseless in action and which may be easily and quickly operated to obtain four different speeds in a forward direction travel of the automobile machine and one speed in the reverse.

The gear shift mechanism comprises in combination with a driving and driven shaft having a gear casing mounted thereon, a pair of sleeves journaled in the casing, each of said sleeves being provided at its side with one or more openings in which lugs are slidably mounted. Gear wheels are journaled upon the sleeves and surround the lugs, said gear wheels being provided at their inner sides with recesses adapted to receive the said lugs when they are projected beyond the surfaces of the sleeve, a spring surrounds each set of lugs and normally retains the lugs within the respective sleeves. Stub shafts are slidably mounted in the sleeves and are adapted to be moved by the gear shift lever of the automobile machine in the usual manner. Said stub shafts are provided with collars having beveled ends which are adapted to engage corresponding surfaces of the lugs when the stub shafts are moved whereby the outer ends of the lugs are projected beyond the surfaces of the collars and they enter the recesses in the gear wheels. The driving shaft is in permanent mesh with one of the gear wheels and the remaining gear wheels upon the collars are operatively connected with each other whereby the automobile machine may travel in a forward direction at four different rates of speeds and the one rate of speed in reverse.

In the accompanying drawings:—

Figure 1 is a vertical sectional view of the gear shift cut on the line 1—1 of Figure 2.

Figure 2 is a top plan view of the gear shift.

Figure 3 is a front end view of the gear shift showing parts in section and cut on the line 3—3 of Figure 2.

Figure 4 is a fragmentary horizontal sectional view of the gear shift.

Figure 5 is a fragmentary transverse sectional view through one of the gear wheels cut on the line 5—5 of Figure 4 and showing the lugs in retracted position.

Figure 6 is a similar view showing the lugs in extended position.

Figure 7:
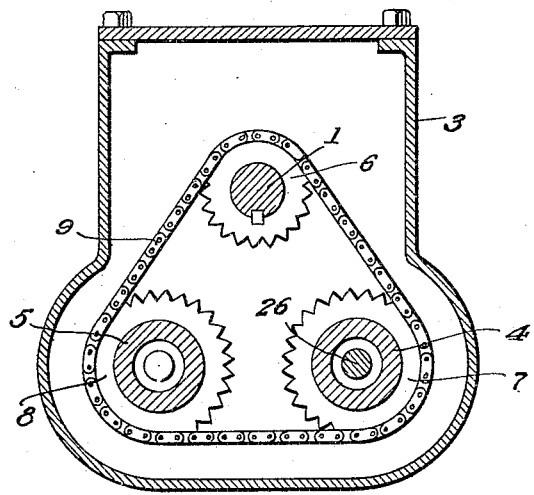
Figure 7 is a transverse sectional view cut on the line 7—7 of Figure 1.
Figures 8, 9:
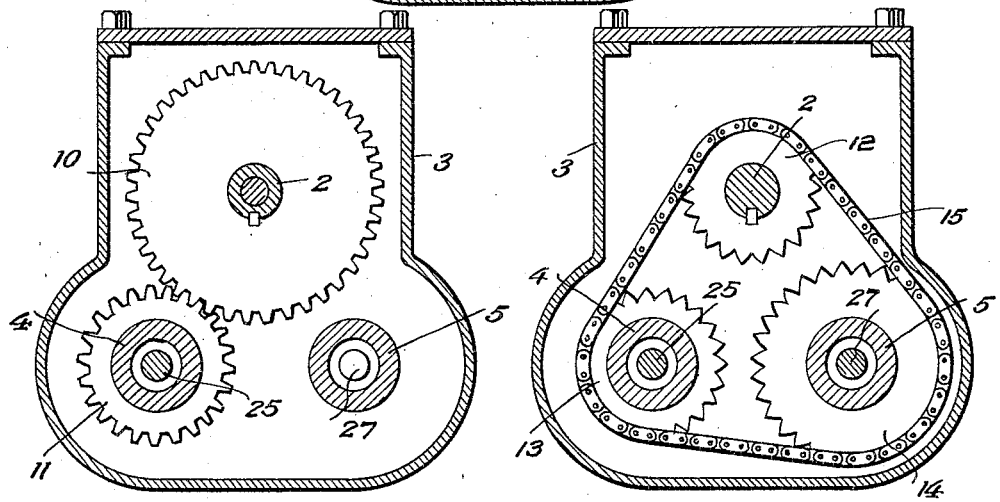
Figure 8 is a similar view cut on the line 8—8 of Figure 1.
Figure 9 is a similar view cut on the line 9—9 of Figure 1.
Figure 10:
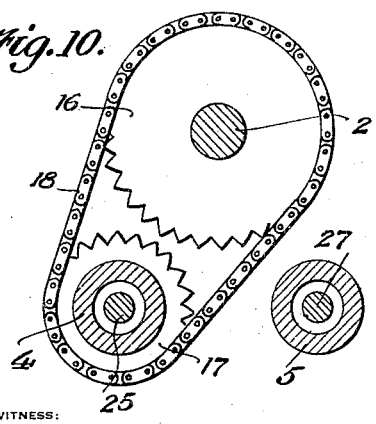
Figure 11:
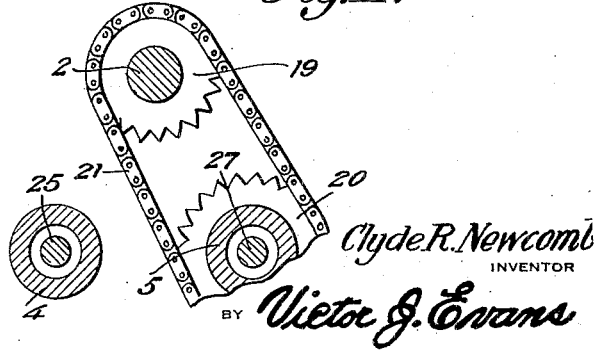

Figures 10 and 11 are fragmentary sectional views cut on the lines 10—10 and 11—11 respectively of Figure 1.

The gear shift mechanism includes a drive shaft 1 which is aligned with a driven shaft 2 and a gear casing 3 mounted upon the said shafts. Hollow sleeves 4 and 5 are journaled in the gear casing and lie in a plane below the aligned shafts 1 and 2. A gear wheel 6 is fixed to the shaft 1 and gear wheels 7 and 8 are fixed upon the sleeves 4 and 5 respectively. A chain 9 is trained around the gear wheels 6, 7 and 8. Consequently, when the shaft 1 is rotated, rotary movement is constantly transmitted through the chain 9 to the sleeves 4 and 5. A gear wheel 10 is fixed upon the shaft 2 and meshes with a gear wheel 11 loosely mounted upon the sleeve 4. A gear wheel 12 is fixed upon the shaft 2 and gear wheels 13 and 14 are loosely mounted upon the sleeves 4 and 5 respectively. A chain 15 is trained around the gear wheels 12, 13 and 14. A gear wheel 16 is fixed upon the shaft 1 and a gear wheel 17 is loose upon the sleeve 4. A chain 18 is trained around the gear wheels 16 and 17. A gear wheel 19 is fixed upon the shaft 2 and a gear wheel 20 is mounted upon the sleeve 5. A chain 21 is trained around the gear wheels 19 and 20. The sleeves 4 and 5 are provided at their sides with openings 22, the axes of which are inclined at acute angles with relation to the axes of the respective sleeves. A substantially rhombic lug 23 is slidably mounted in each of the openings 22. The lugs 23 are beveled at their inner corners, as at 24. Stub shafts 25 and 26 are slidably mounted in the sleeve 4 and a stub shaft 27 is slidably mounted in the sleeve 5. The said stub shafts are provided with collars 28, 29 and 30 respectively and the said collars are provided with beveled end surfaces 31 adapated to engage the beveled corners 24 of the lugs 23, as the stub shafts are moved in the sleeves. The lugs 23 are arranged in groups of three and a spring 32 surrounds each group of lugs and serves normally to hold said lugs within the openings. It is apparent that when the stub shafts are moved lonigtudinally, the collars are brought under the inner ends of the lugs and the said lugs are forced outwardly so that their outer ends engage in recesses 33 provided at the inner sides of each of the loose gear wheels upon the sleeves 4 and 5. As the gear wheels are of different sizes and there are four groups, four different speeds will be provided in one direction and a single speed when in reverse. Stub shafts are provided at their forward ends with cups 34 which may receive a ball 35 at the end of an operating lever 36 in the usual manner. A rack plate 37 is provided for controlling and directing the movement of the lever so that any particular stub shaft may be moved in its receiving sleeve to effect a desired shifting of the gear.

Having described the invention what is claimed is:

1. A gear shift comprising aligned driving and driven shafts, a casing mounted upon the shafts, sleeves journaled in the casing and provided at their sides with openings disposed at angles of 45 degrees to the axes of the sleeves, lugs slidable in the openings, said lugs being rhombus shaped, gear wheels journaled upon the sleeves and having recesses adapted to receive the ends of the lugs, springs surrounding the lugs and normally holding them at retracted position, one of said gear wheels being operatively connected with the driving shaft, the remaining gear wheels being operatively connected together in sets, stub shafts slidable in the sleeve and collars mounted upon the stub shafts and adapted to engage the lugs to move them in the openings of the sleeves and into the recesses of the gear wheels.

2. A gear shift comprising aligned driving and driven shafts, a casing mounted upon the shafts, sleeves journaled in the casing and provided at their sides with openings, the axes of said openings being inclined at acute angles with relation to the axes of the sleeves, lugs slidable in the openings, said lugs being rhombus shaped, gear wheels journaled upon the sleeves and having recesses adapted to receive the ends of the lugs, springs surrounding the lugs and normally holding them at retracted position within the openings, one of the said gear wheels being operatively connected with the driving shaft and means operatively connecting the remaining gear wheels together in sets and stub shafts slidable in the sleeve and having collars adapted to engage the lugs and project the same beyond the outer surfaces of the sleeve.

3. A gear shift comprising aligned driving and driven shafts, a casing mounted upon the shafts, sleeves journaled in the casing and provided at their sides with openings, the axes of said openings being inclined at acute angles with relation to the axes of the sleeves, lugs slidable in the openings, said lugs being rhombus shaped in side elevation and having beveled inner ends, gear wheels journaled upon the sleeves and provided at their inner sides with recesses adapted to receive the lugs, springs surrounding the lugs and normally holding them in retracted position and stub shafts slidably mounted in these sleeves and having collars the ends of which are beveled and adapted to engage the beveled ends of the lugs to project the lugs beyond the sleeves and into the recesses of the gear wheels.

In testimony whereof I affix my signature.

CLYDE R. NEWCOMB.